(12) United States Patent
Yoshimura et al.

(10) Patent No.: US 11,964,416 B2
(45) Date of Patent: Apr. 23, 2024

(54) RESIN PART AND ITS MANUFACTURING METHOD

(71) Applicant: DENSO CORPORATION, Kariya (JP)

(72) Inventors: Yohei Yoshimura, Kariya (JP); Takeshi Kusano, Kariya (JP); Kentaro Fukuda, Kariya (JP); Mitsuhiro Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 265 days.

(21) Appl. No.: 17/358,311

(22) Filed: Jun. 25, 2021

(65) Prior Publication Data

US 2021/0316487 A1 Oct. 14, 2021

Related U.S. Application Data

(63) Continuation of application No. PCT/JP2019/047206, filed on Dec. 3, 2019.

(30) Foreign Application Priority Data

Dec. 26, 2018 (JP) .................................. 2018-242745

(51) Int. Cl.
  *B32B 3/10* (2006.01)
  *B29C 45/27* (2006.01)
  *B29C 45/38* (2006.01)
  *B29C 45/56* (2006.01)

(52) U.S. Cl.
  CPC .......... *B29C 45/56* (2013.01); *B29C 45/2708* (2013.01); *B29C 45/38* (2013.01); *B29C 2045/2714* (2013.01); *B29C 2793/009* (2013.01)

(58) Field of Classification Search
  None
  See application file for complete search history.

(56) References Cited

U.S. PATENT DOCUMENTS

| 4,820,149 A | 4/1989 | Hatakeyama et al. |
| 2008/0044613 A1 | 2/2008 | Shoji et al. |
| 2010/0173148 A1 | 7/2010 | Summerer |

FOREIGN PATENT DOCUMENTS

| DE | 112005002905 B4 | 11/2009 |
| DE | 102009003981 A1 | 7/2010 |
| DE | 102013205141 A1 | 9/2014 |
| JP | 2001058335 A | 3/2001 |
| JP | 2003340889 A * | 12/2003 |
| JP | 2009102537 A | 5/2009 |

OTHER PUBLICATIONS

Machine translation of JP-2003340889-A (Year: 2003).*

(Continued)

*Primary Examiner* — Christopher M Polley
(74) *Attorney, Agent, or Firm* — Harness, Dickey & Pierce, P.L.C.

(57) ABSTRACT

A resin part includes a molded main body that has a plate shape with a longitudinal direction and is constituted of an injection-molded product. The resin part has a gate portion that is a vestige of a resin injection gate. The gate portion is located in an end face part of the molded main body to cross a position corresponding to a center of gravity of the molded main body; the end face part extends in the longitudinal direction of the molded main body.

8 Claims, 2 Drawing Sheets

(56) References Cited

OTHER PUBLICATIONS

Lapshin, B.B., "Principles of Injection Molding of Thermoplastics", Jul. 13, 2022, Light Industry Press.
Zhang Ziqin, "Instances of formulation design and processing of functional plastic products," Jul. 13, 2022, National Defense Industry Press.
U.S. Appl. No. 17/358,342, filed Jun. 25, 2021, Denso Corporation.
International Search Report regarding International Patent Application No. PCT/JP2019/047206, dated Feb. 10, 2020.
U.S. Appl. No. 17/358,342, filed Jun. 25, 2021, Yohei Yoshimura.

* cited by examiner

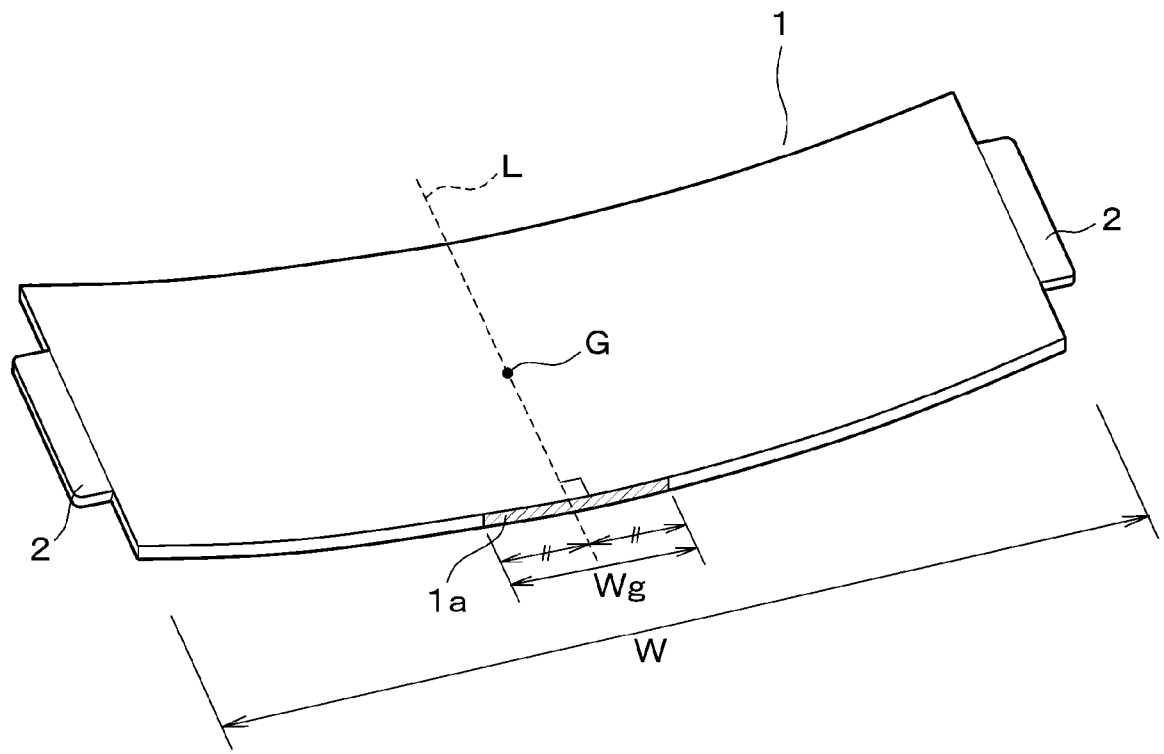
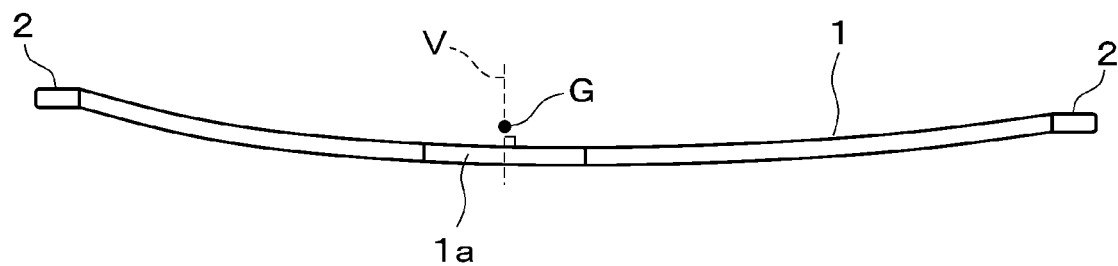

RESIN PART AND ITS MANUFACTURING METHOD

CROSS-REFERENCE TO RELATED APPLICATIONS

The present application is a continuation application of International Application No. PCT/JP2019/047206 filed on Dec. 3, 2019, which is based on and claims priority from Japanese Patent Application No. 2018-242745 filed on Dec. 26, 2018. The entire contents of these applications are incorporated by reference into the present application.

BACKGROUND

1 Technical Field

The present disclosure relates to a resin part and its manufacturing method; the resin part includes a molded main body that has a plate shape with a longitudinal direction and is constituted of an injection-molded product.

2 Description of Related Art

For example, in an in-vehicle head-up display unit, there are employed optical elements such as a lens, which has a function of forming an image using light rays projected from an LCD or a laser scan module, and a mirror. Moreover, in a laser-type image-detection/distance-measuring unit installed in a vehicle, there are also employed optical elements such as a lens, which has a laser-beam imaging function and various correction functions, and a mirror.

In recent years, to meet demands for weight saving and cost reduction, these optical elements have been changed from conventional glass-made products to plastic-made products. Furthermore, to realize a plurality of functions with a minimum number of elements, the transcription surfaces thereof have been changed to have unique shapes, such as complicated aspherical shapes and polyhedral shapes, as well as spherical shapes.

Optical parts as described above are generally manufactured using an injection molding method or an injection-compression molding method (see, for example, Japanese Patent Application Publication No. JP 2001-058335 A). The injection-compression molding method is a molding method in which: an insert for forming part of a transcription surface in a metal mold is configured as a movable insert; and the movable insert advances to supplement pressure against the volume shrinkage due to the cooling of resin filled in the metal mold. Consequently, occurrence of so-called sink marks can be suppressed and the figure accuracy can be secured. Moreover, according to the above patent document, the movable insert is arranged at a location where low transcription accuracy is allowed; upon progress in the cooling of the resin, the movable resin is moved in the direction of forming a gap between it and the resin. Consequently, sink marks are allowed to occur at the location where low transcription accuracy is allowed, thereby improving the transcription accuracy at the other locations.

SUMMARY

In molding optical parts by the injection molding method or the injection-compression molding method as described above, it is desirable for the resin pressure and the resin temperature in the metal mold to be uniform throughout the metal mold in a step in which a rein material molten by heating is injection-filled into the metal mold and then solidified by cooling. Consequently, the desired figure accuracy of the molded product can be secured. However, depending on the manner in which the resin flows into the metal mold, the pressure distribution during the filling and the filling time may vary, thereby making it difficult to secure the desired figure accuracy. Due to the occurrence of such a problem, minute figure distortion may occur in the molded product. Consequently, in a head-up display, distortion may occur in the projected image. Otherwise, in a laser-type image detection unit, misrecognition may occur in the obstacle detection.

The present disclosure has been accomplished in view of the above circumstances.

According to one aspect of the present disclosure, there is provided a resin part. The resin part includes a molded main body that has a plate shape with a longitudinal direction and is constituted of an injection-molded product. The resin part has a gate portion that is a vestige of a resin injection gate. The gate portion is located in an end face part of the molded main body to cross a position corresponding to a center of gravity of the molded main body; the end face part extends in the longitudinal direction of the molded main body.

According to another aspect of the present disclosure, there is provided a method of manufacturing a resin part. The resin part includes a molded main body that has a plate shape with a longitudinal direction and is constituted of an injection-molded product. The method includes an injection molding step in which the molded main body is injection-molded by a molding apparatus. The molding apparatus includes a metal mold corresponding to the molded main body and an injection gate through which resin is injected into the metal mold. In the metal mold, the injection gate is located at a position corresponding to an end face part of the molded main body to cross a position corresponding to a center of gravity of the molded main body; the end face part of the molded main body extends in the longitudinal direction of the molded main body.

The inventors of the present application have repeated various trials and researches for securing, in molding an injection-molded product that has a plate shape with a longitudinal direction, high transcription accuracy of a transcription surface while suppressing figure distortion and thereby securing high figure accuracy; the injection-molded product may be, for example, an optical part such as a mirror or a lens. As a result, the inventors have found that advantageous effects can be achieved by locating the gate portion of the molded main body (or the resin injection gate of the metal mold of the molding apparatus) in an end face part of the molded main body to cross the position corresponding to the center of gravity of the molded main body; the end face part extends in the longitudinal direction of the molded main body. In addition, the position corresponding to the center of gravity of the molded main body is that position in the end face part through which a gravity-center line extends; the gravity-center line is defined to extend through the center of gravity of the molded main body and perpendicular to the longitudinal direction of the molded main body. In the case where the molded main body has a curved surface and thus the gravity-center line is located away from the end face part, the position corresponding to the center of gravity is the position where a normal line is drawn from the gravity-center line to the curved surface.

With the resin injection gate and thus the gate portion located to cross the position corresponding to the center of gravity of the molded main body, the molten resin can be filled into the metal mold evenly on both sides in the longitudinal direction. Consequently, the pressure distribution and the temperature distribution in the metal mold can be made satisfactory, i.e., uniform with little variation. Moreover, with the resin injection gate formed to have a relatively large width crossing the position corresponding to the center of gravity, it becomes possible to reduce the frictional resistance when the molten resin flows through the injection gate and to make the flow of the molten resin in the metal mold uniform and thus satisfactory. As a result, it becomes possible to achieve the advantageous effects of suppressing occurrence of minute figure distortion in the molded main body, which has the plate shape with the longitudinal direction, and securing high transcription accuracy.

BRIEF DESCRIPTION OF THE DRAWINGS

FIG. 1 is a perspective view of an optical part according to an embodiment.

FIG. 2 is a front view of the optical part according to the embodiment.

DESCRIPTION OF EMBODIMENTS

Figure 3:
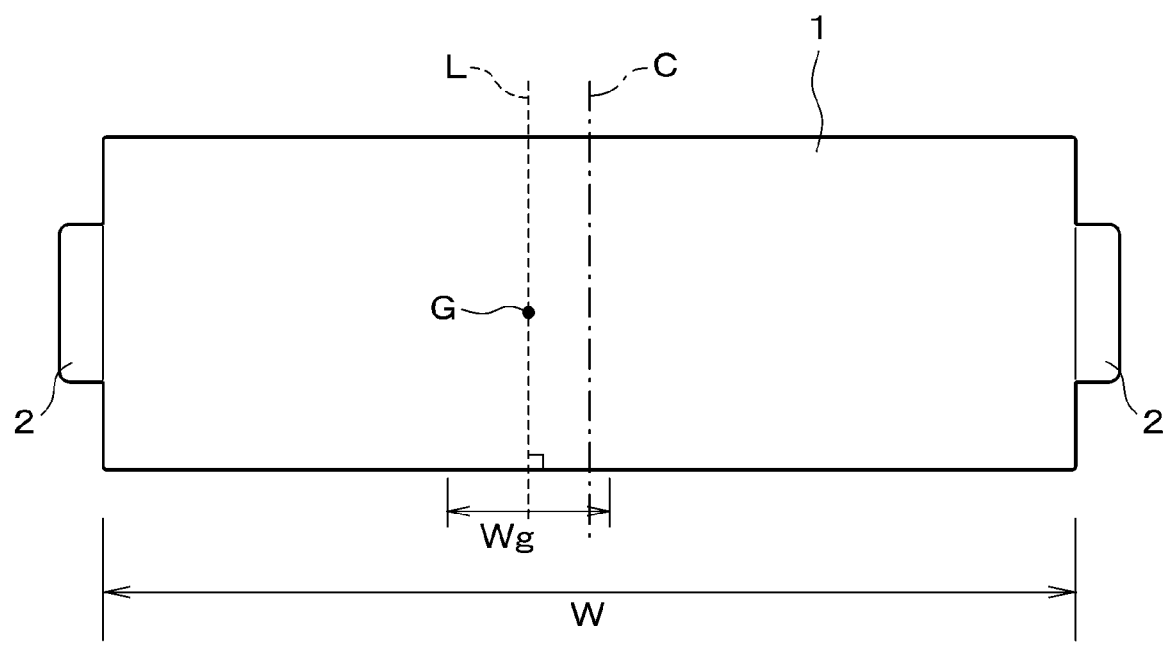
FIG. 3 is a plan view of the optical part according to the embodiment.

Hereinafter, an exemplary embodiment applied to optical parts such as a mirror and a lens will be described with reference to the drawings. FIGS. 1-3 show the appearance of a molded main body 1 that constitutes an optical part as a resin part according to the present embodiment. The optical part constituted of the molded main body 1 is designed to be used as a mirror in, for example, an in-vehicle head-up display unit. The molded main body 1 is constituted of an injection-molded product of a thermoplastic resin. As will be described later, the molded main body 1 is manufactured by a manufacturing method according to the present embodiment. As the resin material, for example, a cycloolefin resin, a polyester resin, an acrylic resin, a polycarbonate resin or the like may be employed.

The molded main body 1 is formed in the shape of a rectangular plate that is longer in the left-right direction in the figures, i.e., has a longitudinal direction. Moreover, the molded main body 1 is gently curved in the longitudinal direction to have a concave upper surface. Furthermore, the molded main body 1 is configured to have asymmetrical curvatures at the left and right parts thereof according to the curvatures of a windshield surface on which images are projected. The surface of the molded main body 1 facing upward in the figures constitutes a mirror surface that is a high-accuracy transcription surface. In addition, on the left and right sides of the molded main body 1, there are integrally formed tabs 2.

In the present embodiment, as shown by hatching in FIG. 1 for the sake of convenience, the molded main body 1 has a gate portion 1a that is a vestige of a resin injection gate. The gate portion 1a is located in an end face part of the molded main body 1 to cross a position corresponding to the center of gravity G of the molded main body 1; the end face part of the molded main body 1 extends in the longitudinal direction of the molded main body 1. Specifically, in an edge part at one of the longer sides of the molded main body 1 which is located on the front side in the figure, i.e., in the end face part on the front side, the gate portion 1a is located to be slightly off-center to the left and has a relatively large width Wg. Moreover, as shown in FIGS. 2 and 3, the center of gravity G of the molded main body 1 is located at a position slightly offset to the left in the figures from the centerline C (see FIG. 3) in the longitudinal direction of the molded main body 1 and slightly away from the upper surface of the molded main body 1 upward.

In this case, the position corresponding to the center of gravity G of the molded main body 1 is that position in the end face part through which a gravity-center line L extends; the gravity-center line L is defined to extend through the center of gravity G of the molded main body 1 and perpendicular to the longitudinal direction of the molded main body 1. Moreover, in the case of the gravity-center line L being located above the upper surface of the molded main body 1, the position corresponding to the center of gravity G is the position where a normal line V (see FIG. 2) is drawn from the gravity-center line L to the upper surface of the molded main body 1. The gate portion 1a is provided so as to have the same width (Wg/2) on both the left and right sides of the gravity-center line L. In the present embodiment, the width Wg of the gate portion 1a is set to be smaller than or equal to ½ of a maximum length W of the molded main body 1 in the longitudinal direction, and more particularly, to be in the range of $(W/4) \leq Wg \leq (W/3)$.

Next, a molding apparatus used for manufacturing the molded main body 1 will be described. Though not shown in the drawings, the molding apparatus includes: a metal mold having a cavity corresponding to the molded main body 1; an opening/closing mechanism for opening and closing the metal mold; a resin injection mechanism for injecting molten resin into the cavity; and a product demolding mechanism for demolding the molded main body 1 that is a product having been solidified by cooling. Moreover, the molding apparatus further includes: temperature sensors for detecting the temperatures of respective portions of the cavity; pressure sensors for detecting the pressures of respective portions of the cavity; a temperature regulator for regulating the temperature of the metal mold; and a controller for controlling the entire molding apparatus.

An injection gate in the resin injection mechanism, through which the molten resin is injected into the cavity of the metal mold, corresponds to the position of the gate portion 1a. Moreover, in the molding apparatus, there is also provided a gate opening/closing mechanism capable of opening/closing the injection gate at arbitrary timing. Furthermore, in the present embodiment, though not shown in the drawings, a movable insert is provided in a cavity forming portion of the metal mold; the movable insert is configured to be driven by a movable-insert drive mechanism provided in the molding apparatus. Specifically, the movable insert is provided in a portion of the metal mold for forming a surface of the molded main body 1 on the opposite side to a surface of the molded main body 1 which requires surface accuracy, and more particularly, in a portion of the metal mold for forming the lower surface of the molded main body 1, so as to form almost the entire lower surface of the molded main body 1 except for outer peripheral portions. Moreover, the movable insert is moved in a direction of advancing and retreating in the cavity.

Next, explanation will be given of a process of manufacturing the molded main body 1 using the molding apparatus configured as described above. In molding the molded main body 1 by the above-described molding apparatus, an injection molding step is performed such that: molten resin is injected into the cavity by the resin injection mechanism with the metal mold being in a clamped state; and then the molten resin is solidified by cooling to form the molded main body 1. In the injection molding step, the temperature of the metal mold is kept at a relatively low temperature, for example, at a temperature lower than the glass transition temperature of the resin material by 20-30 degrees. Moreover, in an initial state of the injection molding step, the movable insert of the metal mold is located at an initial position where the movable insert is in a state of being continuous with other cavity portions of the metal mold.

In the injection molding step, the molten resin is injected into the cavity from the injection gate of the metal mold. At this time, the resin injection gate of the metal mold, and thus the gate portion 1a of the resultant molded main body 1 are located at a position crossing the position corresponding to the center of gravity G of the molded main body 1. Consequently, the molten resin can be filled into the cavity evenly on both sides in the longitudinal direction; thus the pressure distribution and the temperature distribution in the cavity can be made satisfactory, i.e., uniform with little variation.

Moreover, the injection gate and thus the gate portion 1a are formed to have the relatively large width crossing the position corresponding to the center of gravity G. Consequently, it becomes possible to reduce the frictional resistance when the molten resin flows through the injection gate and to make the flow of the molten resin in the cavity uniform and thus satisfactory. In particular, with the width Wg of the injection gate set to be smaller than or equal to ½ of the maximum length W of the molded main body 1 in the longitudinal direction, the flow of the molten resin can be made very satisfactory. On the other hand, the lower limit of the width Wg may be set to be larger than or equal to ⅛ of the maximum length W. It is more preferable for the width Wg to be in the range of $(W/4) \leq Wg \leq (W/3)$.

Furthermore, in the present embodiment, in the injection molding step, a gate-cut operation is performed upon completion of the injection of the resin into the cavity of the metal mold by the resin injection mechanism, i.e., upon completion of the filling of the resin into the entire cavity; the gate-cut operation is an operation of closing the injection gate by the gate opening/closing mechanism. Consequently, the injection gate is closed, immediately after the injection of the molten resin, in a state where the viscosity of the resin is low, i.e., in a state where shrinkage on curing has not started. As a result, the pressure in the cavity can be made substantially uniform throughout the cavity, and in that state, curing of the molten resin by cooling progresses.

Moreover, in the present embodiment, a pressure-application operation is performed immediately after the gate-cut operation is performed; the pressure-application operation is an operation of causing the movable insert to operate in a direction of exerting a pressure-application force to the resin in the cavity. Specifically, the pressure-application operation is performed by moving the movable insert, through the movable-insert drive mechanism, at a set stroke in the direction of advancing from the initial position. Consequently, the resin in the cavity can be controlled to be in a high-pressure state, thereby suppressing the shrinkage ratio of the resin to be low. As a result, it is possible to suppress occurrence of partial pressure drop in those portions of the resin in the cavity where partial curing has progressed; thus it is possible to ensure the uniformity of the overall pressure variation, thereby suppressing occurrence of so-called sink marks.

In addition, since the pressure-application operation is performed by the movable insert at the set stroke, it is possible to prevent the pressure of the resin in the cavity from being excessively increased or insufficiently increased overall; thus it is possible to apply suitable pressure to the resin in the cavity. Thereafter, the curing of the resin in the cavity by cooling progresses. Further, upon solidification of the resin in the cavity, the metal mold is opened and the resultant molded main body 1 is demolded. In the resultant molded main body 1, there remains a vestige of the movable insert. However, this vestige remains on the lower surface of the molded main body 1 which is the surface on the opposite side to the surface of the molded main body 1 requiring surface accuracy; therefore, it is still possible to obtain a highly-accurate shape of the molded main body 1 as an optical part, thereby satisfying requirements in terms of physical properties.

As described above, according to the present embodiment, the gate portion 1a is located in an end face part of the molded main body 1, which extends in the longitudinal direction of the molded main body 1, to cross the position corresponding to the center of gravity G of the molded main body 1; the gate portion 1a is a vestige of the resin injection gate. Consequently, it becomes possible to achieve advantageous effects of suppressing occurrence of minute figure distortion in the molded main body 1, which has the plate shape with the longitudinal direction, and securing high transcription accuracy. Moreover, with the manufacturing method according to the present embodiment, the cycle time can be shortened and the productivity can be improved.

In addition, research by the inventors of the present application has revealed that the residual strain of the resin material in the molded main body 1 according to the present embodiment is extremely low. Consequently, in the molded main body 1, birefringence on radial lines from the center of the gate portion 1a tends to be constant regardless of the distance from the center of the gate portion 1a or to linearly increase with increase in the distance from the center of the gate portion 1a. As a result, it becomes possible to improve the birefringence properties of the molded main body 1. In contrast, in resin parts manufactured by conventional manufacturing methods, birefringence tends to quadratically increase with increase in the distance from the center of the gate portion.

In the above-described embodiment, a resin part according to the present disclosure is applied to a mirror of an in-vehicle head-up display unit. However, a resin part according to the present disclosure can also be applied to optical parts employed in other in-vehicle devices, such as a lens of a laser-type image-detection/distance-measuring unit. Furthermore, a resin part according to the present disclosure can also be applied to parts of various devices other than in-vehicle devices. In the above-described embodiment, the molded main body 1 has the shape of a rectangular plate with a concave surface (or free-form surface). However, the molded main body 1 may alternatively have the shape of a quadrangular trapezoid, a pentagonal trapezoid, a circle or an ellipse. Moreover, the molded main body 1 may alternatively have a convex surface or a concave-convex surface. In the above-described embodiment, the molded main body 1 has the tabs 2 integrally formed therewith. As an alternative, the molded main body 1 may have no tabs integrally formed therewith. Furthermore, a resin part or an optical part according to the present disclosure may be obtained by further performing a certain process on the molded main body 1 or further mounting an additional part to the molded main body 1.

While the present disclosure has been described pursuant to the exemplary embodiment, it should be appreciated that the present disclosure is not limited to the exemplary embodiment. Instead, the present disclosure encompasses various modifications and various changes within equivalent ranges. In addition, various combinations and modes are also included in the category and the scope of technical idea of the present disclosure.

What is claimed is:

1. A resin part comprising a molded main body that has a plate shape with a longitudinal direction and is constituted of an injection-molded product, the resin part having a gate portion that is a vestige of a resin injection gate, the gate portion being located in an end face part of the molded main body to cross a position corresponding to a center of gravity of the molded main body, the end face part extending in the longitudinal direction of the molded main body.

2. The resin part as set forth in claim 1, wherein a width Wg of the gate portion is smaller than or equal to ½ of a maximum length W of the molded main body in the longitudinal direction.

3. The resin part as set forth in claim 1, wherein in the molded main body, birefringence is constant regardless of the distance from a center of the gate portion or linearly increases with increase in the distance from the center of the gate portion.

4. A method of manufacturing a resin part, the resin part comprising a molded main body that has a plate shape with a longitudinal direction and is constituted of an injection-molded product, the method comprising an injection molding step in which the molded main body is injection-molded by a molding apparatus, the molding apparatus comprising a metal mold corresponding to the molded main body and an injection gate through which resin is injected into the metal mold, wherein in the metal mold, the injection gate is located at a position corresponding to an end face part of the molded main body to cross a position corresponding to a center of gravity of the molded main body, the end face part of the molded main body extending in the longitudinal direction of the molded main body.

5. The method as set forth in claim 4, wherein a width Wg of the injection gate is larger than or equal to ⅛ of and smaller than or equal to ½ of a maximum length W of the molded main body in the longitudinal direction.

6. The method as set forth in claim 4, wherein in the injection molding step, a gate-cut operation of closing the injection gate is performed, immediately after completion of the injection of the resin into the metal mold, in a state where a viscosity of the resin in the metal mold is low.

7. The method as set forth in claim 6, wherein in the metal mold of the molding apparatus, there is provided a movable insert to exert, on the side of a surface of the molded main body on an opposite side to a surface of the molded main body which requires surface accuracy, a pressure-application force to the resin in the metal mold, and in the injection molding step, a pressure-application operation of causing the movable insert to operate is performed immediately after the gate-cut operation is performed.

8. The method as set forth in claim 7, wherein the pressure-application operation is performed by moving the movable insert inside the metal mold at a set stroke.

* * * * *